United States Patent
Tsai

(10) Patent No.: US 11,470,523 B2
(45) Date of Patent: Oct. 11, 2022

(54) APPARATUSES AND METHODS FOR USER EQUIPMENT (UE) TO REPORT NEW RADIO (NR) MEASUREMENT GAP REQUIREMENT INFORMATION

(71) Applicant: MEDIATEK INC., Hsinchu (TW)

(72) Inventor: Chun-Fan Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 70 days.

(21) Appl. No.: 16/953,927

(22) Filed: Nov. 20, 2020

(65) Prior Publication Data

US 2021/0211953 A1 Jul. 8, 2021

Related U.S. Application Data

(60) Provisional application No. 62/957,371, filed on Jan. 6, 2020.

(51) Int. Cl.
*H04W 36/00* (2009.01)

(52) U.S. Cl.
CPC .............. *H04W 36/0094* (2013.01)

(58) Field of Classification Search
CPC . H04W 36/0094; H04W 76/27; H04W 76/10; H04W 24/10
See application file for complete search history.

(56) References Cited

U.S. PATENT DOCUMENTS

| | | | |
|---|---|---|---|
| 10,567,982 B2 * | 2/2020 | Baghel | H04W 24/02 |
| 10,959,119 B2 * | 3/2021 | Jang | H04L 1/1861 |
| 2020/0195398 A1 * | 6/2020 | Futaki | H04W 72/0453 |
| 2020/0314946 A1 * | 10/2020 | Tsuboi | H04W 24/10 |
| 2021/0153050 A1 * | 5/2021 | Santhanam | H04L 5/0035 |
| 2021/0360729 A1 * | 11/2021 | Yiu | H04W 24/10 |
| 2022/0014953 A1 * | 1/2022 | Teyeb | H04W 24/10 |

OTHER PUBLICATIONS

Chinese language office action dated Nov. 2, 2020, issued in application No. TW 110100072.
"Measurement gap capability information for Rel-16 UE;" Intel Corporation; 3GPP TSG RAN WG2 Meeting #108 R2-1914580; Nov. 2019; pp. 1-7.
"Discussion on NeedForGap signalling in NR SA before NE-DC or NR-DC configuration;" Nokia, Nokia Shanghai Bell; 3GPP TSG-RAN WG2 Meeting #108 R2-1916193; Nov. 2019; pp. 1-5.

* cited by examiner

*Primary Examiner* — Rasheed Gidado

(74) *Attorney, Agent, or Firm* — McClure, Qualey & Rodack, LLP

(57) ABSTRACT

A User Equipment (UE) including a wireless transceiver and a controller is provided. The wireless transceiver performs wireless transmission and reception to and from a first base station. The controller is coupled to the wireless transceiver, and configured to receive an RRC reconfiguration message from the first base station via the wireless transceiver, and in response to the UE being configured to provide measurement gap requirement information of NR target bands, send an RRC reconfiguration complete message including the measurement gap requirement information to the first base station via the wireless transceiver.

16 Claims, 7 Drawing Sheets

APPARATUSES AND METHODS FOR USER EQUIPMENT (UE) TO REPORT NEW RADIO (NR) MEASUREMENT GAP REQUIREMENT INFORMATION

CROSS REFERENCE TO RELATED APPLICATIONS

This application claims priority of U.S. Provisional Application No. 62/957,371, filed on Jan. 6, 2020, the entirety of which is incorporated by reference herein.

BACKGROUND OF THE APPLICATION

Field of the Application

The application generally relates to mobile communications and, more particularly, to apparatuses and methods for User Equipment (UE) to report New Radio (NR) measurement gap requirement information.

Description of the Related Art

In a typical mobile communication environment, User Equipment (UE) (also called Mobile Station (MS)), such as a mobile telephone (also known as a cellular or cell phone), or a tablet Personal Computer (PC) with wireless communications capability, may communicate voice and/or data signals to one or more service networks. The wireless communications between the UE and the service networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc.

These wireless technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In LTE and 5G NR, a technique called "measurement gap" is proposed. The idea is to create a small gap during which no transmission and reception happens with the serving cell, so that the UE is allowed to switch to the target cell(s) and perform signal quality measurement. To make this work seamlessly, an agreement of the gap definition must be well established between the UE and the network. However, the 3GPP has not yet define a way for UE to report measurement gap requirement information in 5G NR.

A solution is sought.

BRIEF SUMMARY OF THE APPLICATION

The present application proposes to allow a UE to report New Radio (NR) measurement gap requirement information during the Radio Resource Control (RRC) reconfiguration procedure.

In a first aspect of the application, a UE comprising a wireless transceiver and a controller is provided. The wireless transceiver is configured to perform wireless transmission and reception to and from a first base station. The controller is coupled to the wireless transceiver, and configured to receive an RRC reconfiguration message from the first base station via the wireless transceiver, and in response to the UE being configured to provide measurement gap requirement information of NR target bands, send an RRC reconfiguration complete message comprising the measurement gap requirement information to the first base station via the wireless transceiver.

In a first implementation form of the first aspect of the application, the controller is further configured to determine whether the RRC reconfiguration message comprises an indicator for requesting the UE to report the measurement gap requirement information, and determine that the UE is configured to provide measurement gap requirement information in response to the RRC reconfiguration message comprising the indicator for requesting the UE to report the measurement gap requirement information.

In a second implementation form of the first aspect of the application, the controller is further configured to determine whether a handover of the UE from one cell to another is occurring, or whether the measurement gap requirement information is changed compared to last time the UE reported this information, and determine that the UE is configured to provide measurement gap requirement information in response to a handover of the UE from one cell to another occurring or in response to the measurement gap requirement information being changed compared to last time the UE reported this information.

In a third implementation form of the first aspect of the application, the controller is further configured to determine whether the UE has not reported any measurement gap requirement information to the first base station on a current RRC connection, and determine that the UE is configured to provide measurement gap requirement information in response to the UE not having reported any measurement gap requirement information to the first base station on the current RRC connection.

In a fourth implementation form of the first aspect of the application, the RRC reconfiguration message comprises at least one of a Carrier Aggregation (CA) parameter and a Layer 1 (L1) parameter, and the measurement gap requirement information is determined based on at least one of the CA parameter and the L1 parameter.

In a fifth implementation form of the first aspect of the application in combination with the fourth implementation form of the first aspect of the application, the CA parameter comprises configuration for Secondary Cell (SCell) addition or release, and the L1 parameter comprises Multiple-Input and Multiple-Output (MIMO) configuration.

In a sixth implementation form of the first aspect of the application, the measurement gap requirement information indicates whether a measurement gap is required for the UE to perform Synchronization Signal Block (SSB)-based measurements on each of the NR target bands supported by the UE.

In a seventh implementation form of the first aspect of the application in combination with the sixth implementation form of the first aspect of the application, the RRC reconfiguration complete message further comprises information indicating whether an interruption interval smaller than the measurement gap is required for the UE to perform SSB-based measurements on each of the NR target bands supported by the UE when the measurement gap is not required.

In an eighth implementation form of the first aspect of the application, when Multi-RAT Dual Connectivity (MR-DC) is configured for the UE to simultaneously communicate with both the first base station being a Secondary Node (SN) and a second base station being a Master Node (MN), the controller is further configured to send an RRC message comprising the measurement gap requirement information to the second base station via the wireless transceiver in response to sending the RRC reconfiguration complete message comprising the measurement gap requirement information to the first base station.

In a ninth implementation form of the first aspect of the application in combination with the eighth implementation form of the first aspect of the application, the RRC message is a UE assistance information message in compliance with a Third Generation Partnership Project (3GPP) Technical Specification (TS) 38.331 for NR, and the RRC reconfiguration message is received from the first base station via a Signaling Radio Bearer 3 (SRB3).

In a second aspect of the application, a method is provided. The method comprises the following steps: receiving an RRC reconfiguration message from a first base station by a UE; and in response to the UE being configured to provide measurement gap requirement information of NR target bands, sending an RRC reconfiguration complete message comprising the measurement gap requirement information to the first base station by the UE.

In a first implementation form of the second aspect of the application, the method further comprises the following steps: determining, by the UE, whether the RRC reconfiguration message comprises an indicator for requesting the UE to report the measurement gap requirement information; and determining that the UE is configured to provide measurement gap requirement information in response to the RRC reconfiguration message comprising the indicator for requesting the UE to report the measurement gap requirement information.

In a second implementation form of the second aspect of the application, the method further comprises the following steps: determining, by the UE, whether a handover of the UE from one cell to another is occurring, or whether the measurement gap requirement information is changed compared to last time the UE reported this information; and determining that the UE is configured to provide measurement gap requirement information in response to a handover of the UE from one cell to another occurring or in response to the measurement gap requirement information being changed compared to last time the UE reported this information.

In a third implementation form of the second aspect of the application, the method further comprises the following steps: determining, by the UE, whether it has not reported any measurement gap requirement information to the first base station on a current RRC connection; and determining that the UE is configured to provide measurement gap requirement information in response to the UE not having reported any measurement gap requirement information to the first base station on the current RRC connection.

In a fourth implementation form of the second aspect of the application, the RRC reconfiguration message comprises at least one of a CA parameter and a L1 parameter, and the measurement gap requirement information is determined based on at least one of the CA parameter and the L1 parameter.

In a fifth implementation form of the second aspect of the application in combination with the fourth implementation form of the second aspect of the application, the CA parameter comprises configuration for SCell addition or release, and the L1 parameter comprises MIMO configuration.

In a sixth implementation form of the second aspect of the application, the measurement gap requirement information indicates whether a measurement gap is required for the UE to perform SSB-based measurements on each of the NR target bands supported by the UE.

In a seventh implementation form of the second aspect of the application in combination with the sixth implementation form of the second aspect of the application, the RRC reconfiguration complete message further comprises information indicating whether an interruption interval smaller than the measurement gap is required for the UE to perform SSB-based measurements on each of the NR target bands supported by the UE when the measurement gap is not required.

In an eighth implementation form of the second aspect of the application, the method further comprises the following step: when MR-DC is configured for the UE to simultaneously communicate with both the first base station being an SN and a second base station being an MN, sending an RRC message comprising the measurement gap requirement information to the second base station by the UE in response to sending the RRC reconfiguration complete message comprising the measurement gap requirement information to the first base station.

In a ninth implementation form of the second aspect of the application in combination with the eighth implementation form of the second aspect of the application, the RRC message is a UE assistance information message in compliance with a 3GPP TS 38.331 for NR, and the RRC reconfiguration message is received from the first base station via a SRB3.

Other aspects and features of the present application will become apparent to those with ordinarily skill in the art upon review of the following descriptions of specific embodiments of the apparatuses and methods for UE to report NR measurement gap requirement information.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
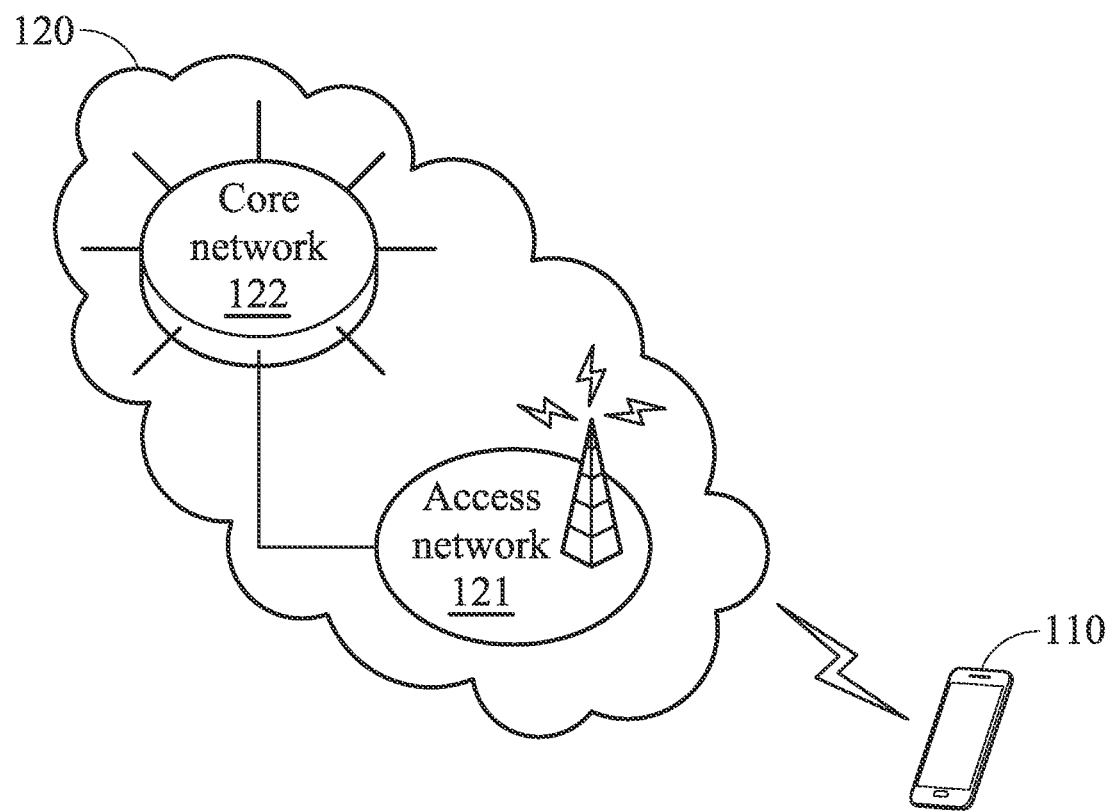
FIG. 1 is a block diagram of a wireless communication environment according to an embodiment of the application.

FIG. 1 is a block diagram of a wireless communication environment according to an embodiment of the application.

As shown in FIG. 1, the wireless communication environment 100 may include a User Equipment (UE) 110 and a service network 120, wherein the UE 110 may be wirelessly connected to the service network 120 for obtaining mobile services.

The UE 110 may be a feature phone, a smartphone, a panel Personal Computer (PC), a laptop computer, or any wireless communication device supporting the RAT (e.g., the 5G NR technology) utilized by the service network 120. In another embodiment, the UE 110 may support more than one RAT. For example, the UE may support the 5G NR technology and a legacy 4G technology, such as the LTE/LTE-A/TD-LTE technology, or the WCDMA technology.

The service network 120 may include an access network 121 and a core network 122. The access network 121 is responsible for processing radio signals, terminating radio protocols, and connecting the UE 110 with the core network 122. The core network 122 is responsible for performing mobility management, network-side authentication, and interfaces with public/external networks (e.g., the Internet). The access network 121 and the core network 122 may each comprise one or more network nodes for carrying out said functions.

In one embodiment, the service network 120 may be a 5G NR network, and the access network 121 and the core network 122 may be a Next Generation Radio Access Network (NG-RAN) and a Next Generation Core Network (NG-CN), respectively.

An NG-RAN may include one or more base stations, such as next generation NodeBs (gNBs), which support high frequency bands (e.g., above 24 GHz), and each gNB may further include one or more Transmission Reception Points (TRPs), wherein each gNB or TRP may be referred to as a 5G base station. Some gNB functions may be distributed across different TRPs, while others may be centralized, leaving the flexibility and scope of specific deployments to fulfill the requirements for specific cases.

A 5G base station may form one or more cells with different Component Carriers (CCs) for providing mobile services to the UE 110. For example, the UE 110 may camp on one or more cells formed by one or more gNBs or TRPs, wherein the cells which the UE 110 is camped on may be referred to as serving cells, including a Primary cell (Pcell) and one or more Secondary cells (Scells).

A NG-CN generally consists of various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

It should be understood that the wireless communication environment 100 described in the embodiment of FIG. 1 is for illustrative purposes only and is not intended to limit the scope of the application. For example, the RAT utilized by the service network 120 may be a future enhancement of the 5G NR technology. That is, the service network 120 may be a 6G, 7G, or 8G 3GPP network. Alternatively, the wireless communication environment 100 may further include a 4G network utilizing the LTE/LTE-A/TD-LTE technology. For example, the 4G network may include an Evolved-Universal Terrestrial Radio Access Network (E-UTRAN) and an Evolved Packet Core (EPC). The E-UTRAN may include one or more evolved NodeBs (eNBs) (e.g., macro eNBs, femto eNBs, or pico eNBs), wherein each eNB may be referred to as a 4G base station. When Multi-RAT Dual Connectivity (MR-DC) is configured for the UE 110, the UE may simultaneously communicate with both a 5G base station (e.g., a gNB) and a 4G base station (e.g., an eNB), wherein the 4G base station may be configured as the Master Node (MN) and the 5G base station may be configured as the Secondary Node (SN).

Figure 2:
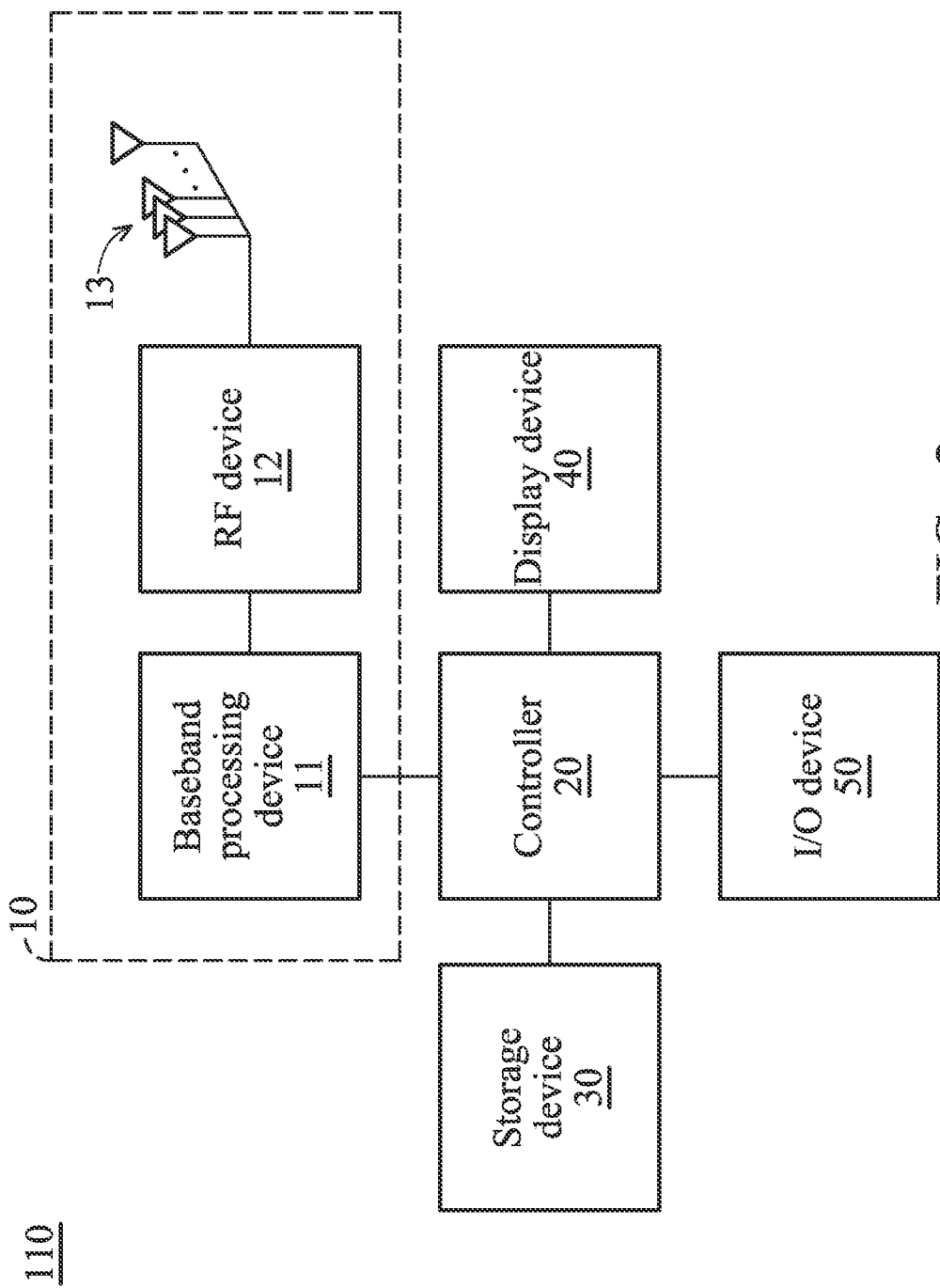
FIG. 2 is a block diagram illustrating the UE 110 according to an embodiment of the application.

FIG. 2 is a block diagram illustrating the UE 110 according to an embodiment of the application.

As shown in FIG. 2, the UE 110 may include a wireless transceiver 10, a controller 20, a storage device 30, a display device 40, and an Input/Output (I/O) device 50.

The wireless transceiver 10 is configured to perform wireless transmission and reception to and from the base station(s) of the service network 120.

Specifically, the wireless transceiver 10 may include a baseband processing device 11, a Radio Frequency (RF) device 12, and antenna 13, wherein the antenna 13 may include an antenna array for beamforming.

The baseband processing device 11 is configured to perform baseband signal processing and control the communications between subscriber identity card(s) (not shown) and the RF device 12. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may comprise a mixer to multiply the baseband signals with a carrier oscillated in the radio frequency of the supported RAT(s), wherein the radio frequency may be any radio frequency (e.g., 30 GHz-300 GHz for mmWave) utilized in the 5G NR technology, or may be 900 MHz, 2100 MHz, or 2.6 GHz utilized in LTE/LTE-A/TD-LTE technology, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communication with the service network 120, storing and retrieving data (e.g., program code) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 for performing the method for UE to report NR measurement gap requirement information.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, communication protocols, and/or the method for UE to report NR measurement gap requirement information.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MIMI) for interaction with users.

It should be understood that the components described in the embodiment of FIG. 2 are for illustrative purposes only and are not intended to limit the scope of the application.

For example, a UE may include more components, such as a power supply, and/or a Global Positioning System (GPS) device, wherein the power supply may be a mobile/replaceable battery providing power to all the other components of the UE, and the GPS device may provide the location information of the UE for use by some location-based services or applications. Alternatively, a UE may include fewer components. For example, the UE may not include the display device 40 and/or the I/O device 50.

Figure 3:
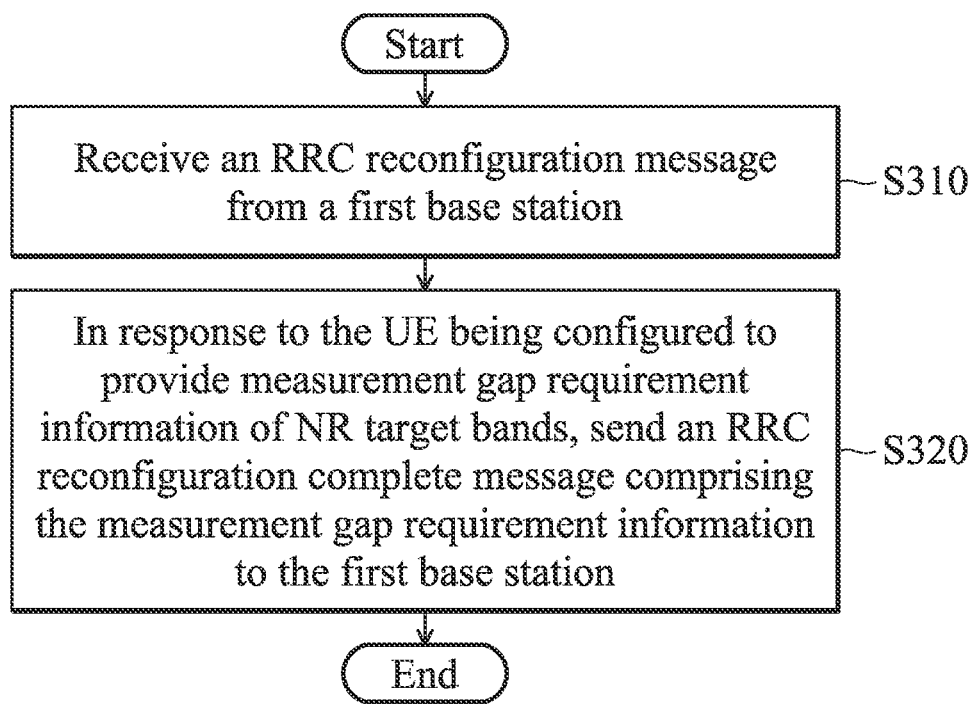
FIG. 3 is a flow chart illustrating the method for UE to report NR measurement gap requirement information according to an embodiment of the application.

FIG. 3 is a flow chart illustrating the method for UE to report NR measurement gap requirement information according to an embodiment of the application.

In this embodiment, the method for UE to report NR measurement gap requirement information may be applied to and executed by a UE (e.g., the UE 110) wirelessly connected to one or more base stations (e.g., a gNB and/or an eNB).

To begin with, the UE receives a Radio Resource Control (RRC) reconfiguration message from a first base station (step S310).

Specifically, the RRC reconfiguration message may include at least a Carrier Aggregation (CA) parameter and/or a Layer 1 (L1) parameter, and the UE may determine the measurement gap requirement information based on the CA parameter and/or the L1 parameter. The CA parameter may include configuration for Scell addition or release, and the L1 parameter may include Multiple-Input and Multiple-Output (MIMO) configuration (e.g., the number of antennas and layers for MIMO).

Next, in response to the UE being configured to provide measurement gap requirement information of NR target bands, the UE sends an RRC reconfiguration complete message comprising the measurement gap requirement information to the first base station (step S320).

Specifically, the measurement gap requirement information indicates whether a measurement gap is required for the UE to perform Synchronization Signal Block (SSB)-based measurements on each of the NR target bands supported by the UE.

Figure 4:
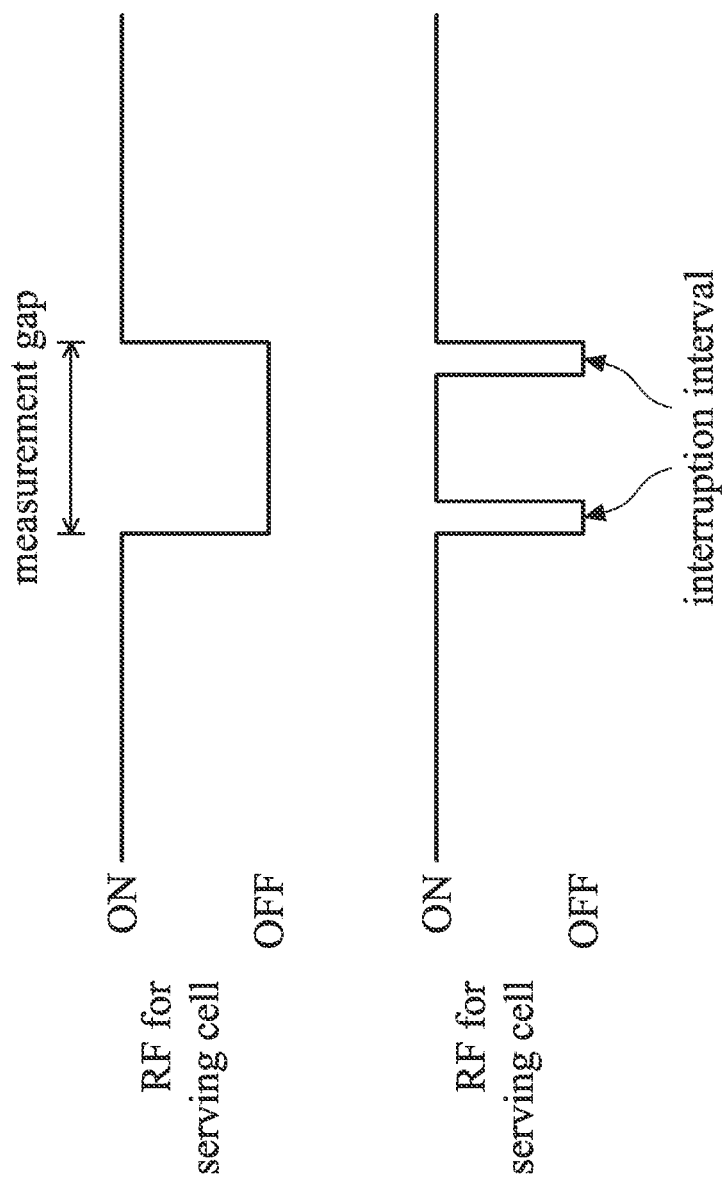
FIG. 4 is a schematic diagram illustrating exemplary measurement gap and interruption interval according to an embodiment of the application.

In addition to the measurement gap requirement information, the RRC reconfiguration complete message may also include information indicating whether an interruption interval smaller than the measurement gap is required for the UE to perform SSB-based measurements on each of the NR target bands supported by the UE when the measurement gap is not required. It should be understood that interruption due to RF switching for measurements may be a common issue. That is, even if the UE has 2 RF chains for simultaneously communicating with the serving cell and target cells, an interruption interval may still be caused on the communication with the serving cell upon RF switching for measuring the target cells. FIG. 4 is a schematic diagram illustrating exemplary measurement gap and interruption interval according to an embodiment of the application.

Referring back to FIG. 3, in one embodiment, the RRC reconfiguration message may include an indicator for requesting the UE to report the measurement gap requirement information, and it may be determined that the UE is configured to provide measurement gap requirement information if the RRC reconfiguration message includes the indicator for requesting the UE to report the measurement gap requirement information.

In another embodiment, the UE may determine whether a handover of the UE from one cell to another is occurring, or whether the measurement gap requirement information is changed compared to last time the UE reported this information based on the CA and/or L1 parameters included in the RRC reconfiguration message. It may be determined that the UE is configured to provide measurement gap requirement information, if a handover of the UE from one cell to another is occurring, or if the measurement gap requirement information is changed compared to last time the UE reported this information.

In another embodiment, the UE may determine whether it has not reported any measurement gap requirement information to the first base station on the current RRC connection, and it may be determined that the UE is configured to provide measurement gap requirement information if the UE has not reported any measurement gap requirement information to the first base station on the current RRC connection.

Figure 5:
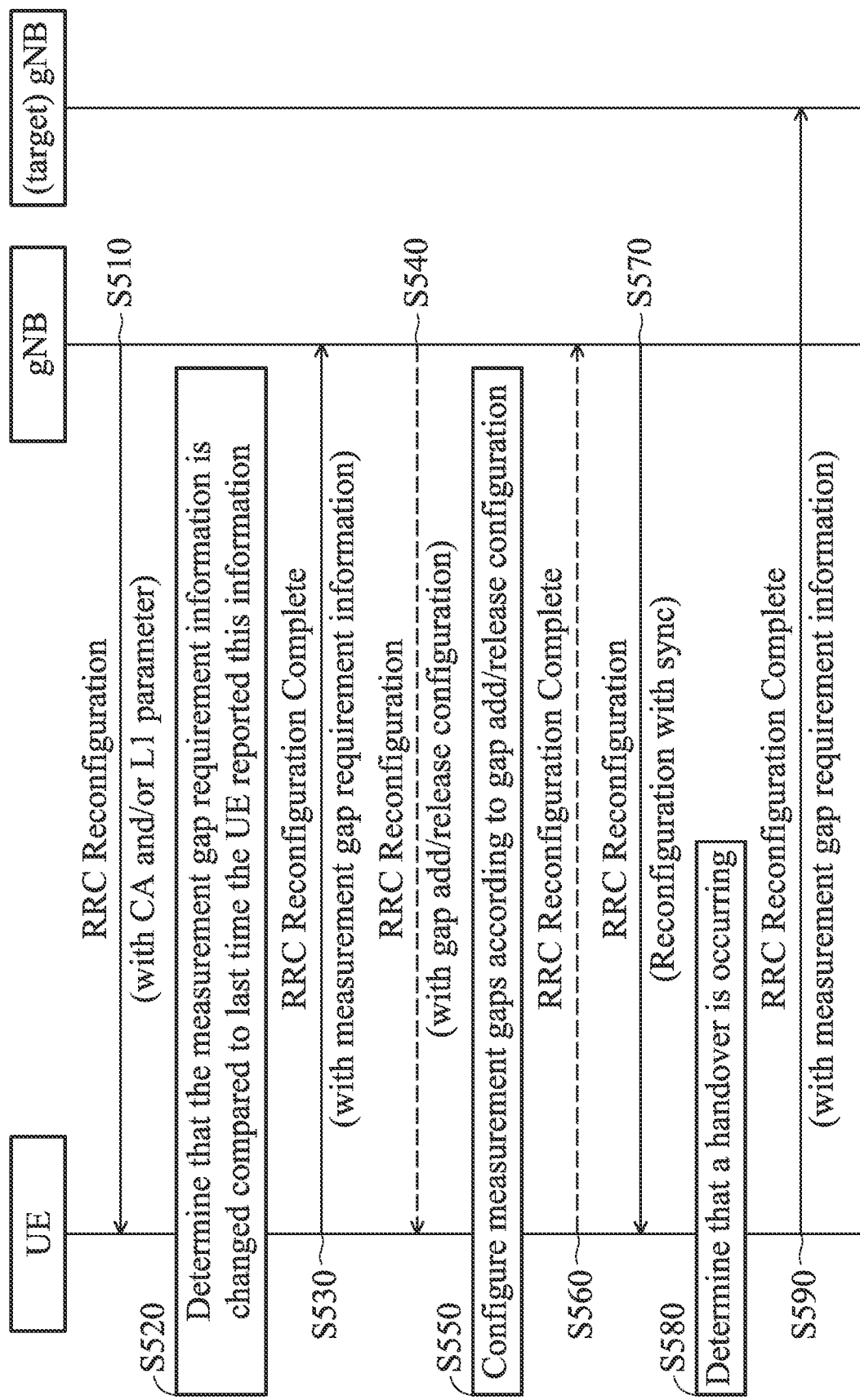
FIG. 5 is a message sequence chart illustrating the reporting of NR measurement gap requirement information according to an embodiment of the application.

FIG. 5 is a message sequence chart illustrating the reporting of NR measurement gap requirement information according to an embodiment of the application.

In step S510, the UE receives an RRC Reconfiguration message from the gNB. Specifically, the RRC Reconfiguration message includes CA and/or L1 parameters. In addition to the CA and/or L1 parameters, the RRC Reconfiguration message may also include an indicator for requesting the UE to report measurement gap requirement information. For example, the indicator for requesting the UE to report measurement gap requirement information may be included in a "NeedForGapsConfig" Information Element (IE) of the RRC Reconfiguration message.

In step S520, the UE applies the CA and/or L1 parameters and determines that the measurement gap requirement information is changed compared to last time the UE reported this information.

In step S530, the UE sends an RRC Reconfiguration Complete message including the measurement gap requirement information to the gNB. Specifically, the measurement gap requirement information may be included in a "NeedForGapsInfoNR" IE of the RRC Reconfiguration Complete message.

In step S540, the UE receives an RRC Reconfiguration message from the gNB. Specifically, the RRC Reconfiguration message includes information for measurement gap addition or release.

In step S550, the UE configures the measurement gaps according to the information for measurement gap addition or release.

In step S560, the UE sends an RRC Reconfiguration Complete message to the gNB.

In step S570, the gNB sends an RRC Reconfiguration message to the UE in response to the decision of triggering a handover of the UE from the gNB to a target gNB. Specifically, the RRC Reconfiguration message includes the handover configuration. For example, the handover configuration may be included in the "reconfigurationWithSync" IE of the RRC Reconfiguration message, wherein the "reconfigurationWithSync" IE includes the random access configuration to be used for handover.

In step S580, the UE determines that a handover is occurring based on the handover configuration and applies the handover configuration.

In step S590, the UE sends an RRC Reconfiguration Complete message including the measurement gap requirement information to the target gNB to complete the handover. Specifically, the measurement gap requirement information may be included in a "NeedForGapsInfoNR" IE of the RRC Reconfiguration Complete message.

Please note that in FIG. 5, steps S540~S590 are optional. In particular, steps S540~S560 are performed if it's necessary to add or release measurement gap(s), while steps S570~S590 are performed if a handover is occurring.

In view of the forgoing embodiments of FIGS. 3-5, it will be appreciated that the present application allows a UE to report NR measurement gap requirement information during the RRC reconfiguration procedure. In particular, all NR bands supported by the UE are reported in the measurement gap requirement information. Advantageously, the reported information contains just enough information that can reduce the size of information to be reported and can provide for the changes of measurement targets. By contrast, in LTE release 14, the reported measurement gap requirement information only includes the gap requirement per carrier of the serving band (i.e., too little information may cause the measurement gap requirement to change every time the measurement target is changed); and in legacy LTE, the reported measurement gap requirement information includes the gap requirement per carrier of all supported bands (i.e., the reported information is over-sized).

Figure 6:
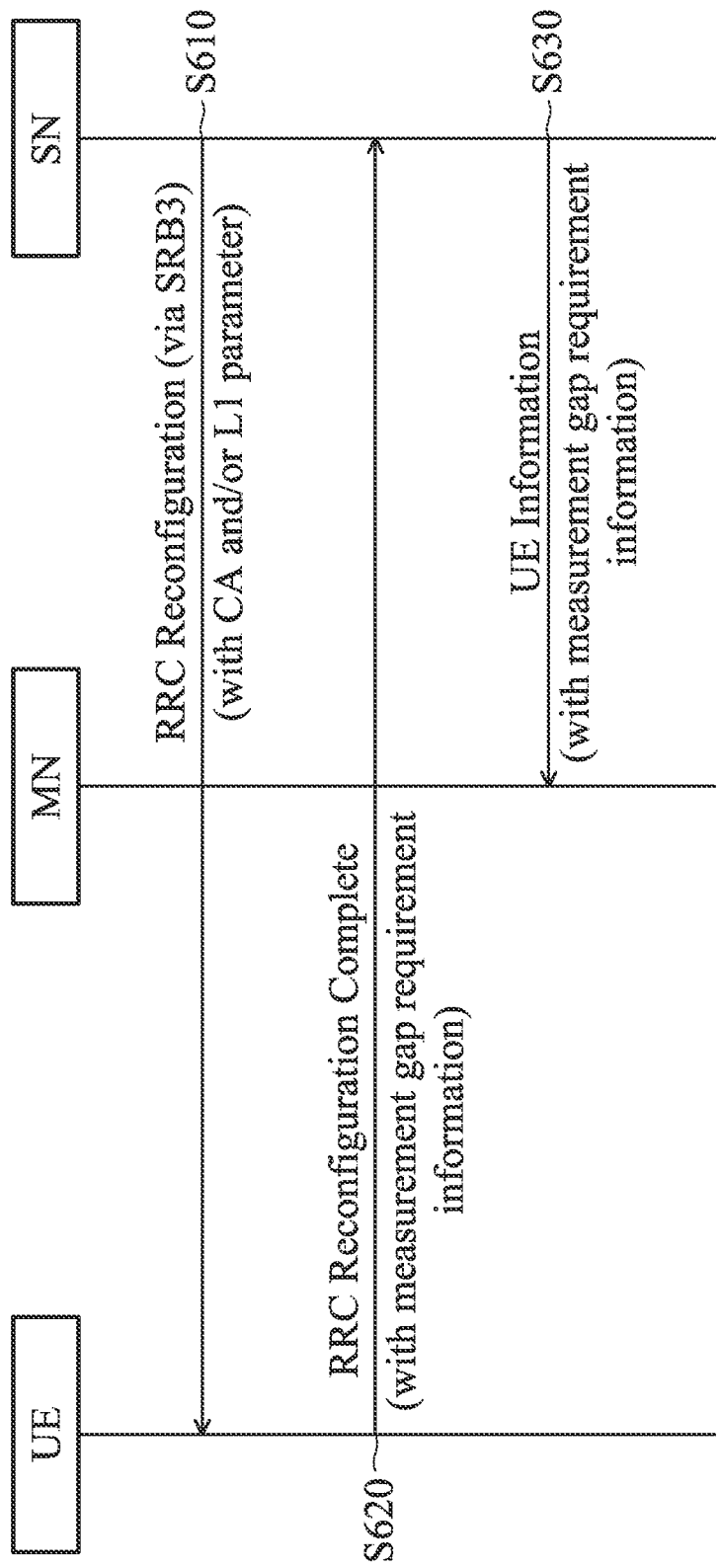
FIG. 6 is a message sequence chart illustrating the reporting of NR measurement gap requirement information when MR-DC is configured according to an embodiment of the application.

FIG. 6 is a message sequence chart illustrating the reporting of NR measurement gap requirement information when MR-DC is configured according to an embodiment of the application.

In step S610, the UE receives an RRC Reconfiguration message from the SN via the Signaling Radio Bearer 3 (SRB3). Specifically, the RRC Reconfiguration message includes CA and/or L1 parameters that cause a change of the measurement gap requirement information. For example, the Secondary Cell Group (SCG) Band Combination (BC) may be changed due to applying the CA and/or L1 parameters, and the change of SCG BC further results in the change of measurement gap requirement information.

In step S620, the UE updates the measurement gap requirement information based on the CA and/or L1 parameters, and sends an RRC Reconfiguration Complete message including the measurement gap requirement information to the SN. Specifically, the measurement gap requirement information may be included in a "NeedForGapsInfoNR" IE of the RRC Reconfiguration Complete message.

In step S630, the SN forwards the UE's measurement gap requirement information to the MN via an inter-node message. Specifically, the inter-node message may be newly defined for delivering the UE's measurement gap requirement information between the SN and the MN. For example, the inter-node message may be named as a UE Information message.

Figure 7:
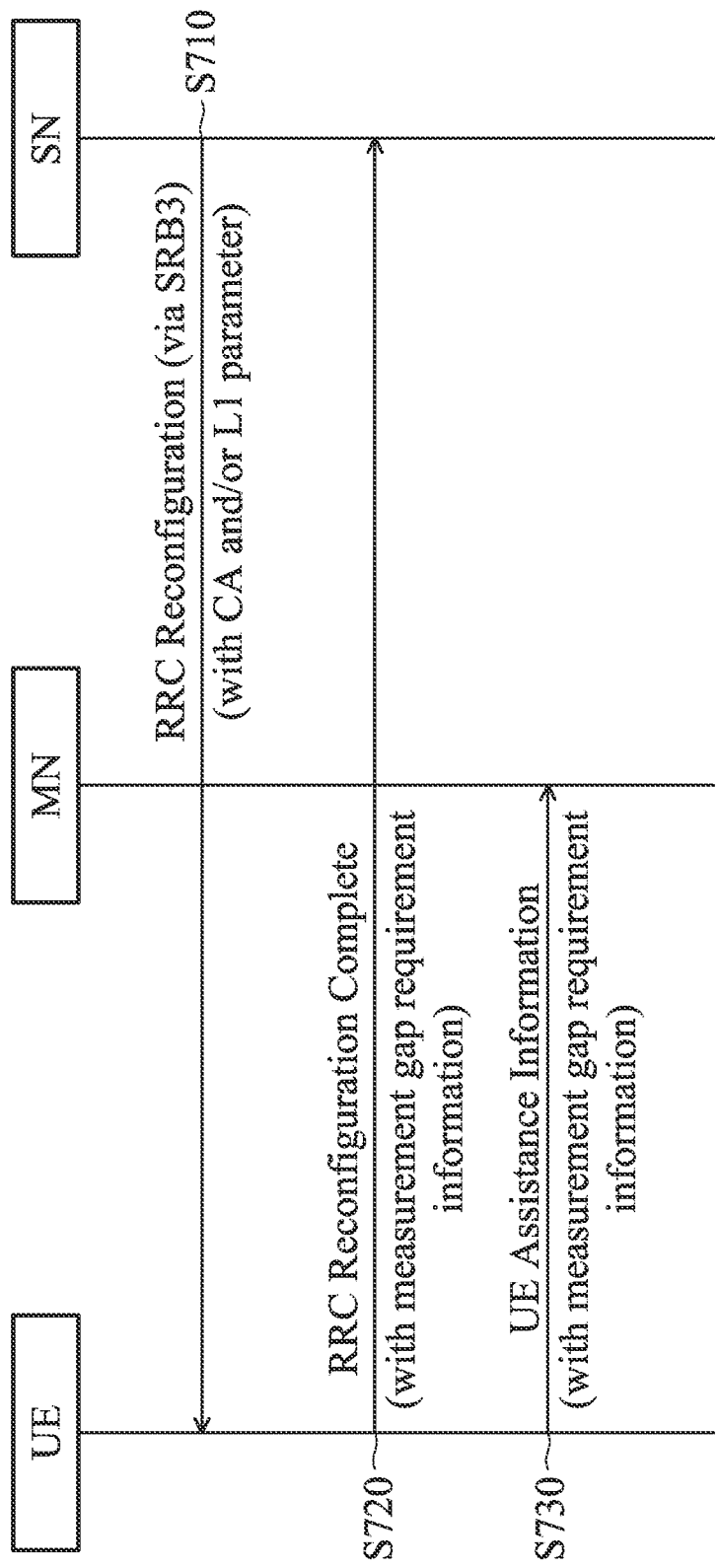
FIG. 7 is a message sequence chart illustrating the reporting of NR measurement gap requirement information when MR-DC is configured according to another embodiment of the application.

FIG. 7 is a message sequence chart illustrating the reporting of NR measurement gap requirement information when MR-DC is configured according to another embodiment of the application.

In step S710, the UE receives an RRC Reconfiguration message from the SN via the SRB3. Specifically, the RRC Reconfiguration message includes CA and/or L1 parameters that cause a change of the measurement gap requirement information.

In step S720, the UE updates the measurement gap requirement information based on the CA and/or L1 parameters, and sends an RRC Reconfiguration Complete message including the measurement gap requirement information to the SN. Specifically, the measurement gap requirement information may be included in a "NeedForGapsInfoNR" IE of the RRC Reconfiguration Complete message.

In step S730, the UE sends an RRC message including the measurement gap requirement information to the MN as well. For example, the RRC message may be a UE Assistance Information message in compliance with the 3GPP Technical Specification (TS) 38.331 for NR.

Please note that the 3GPP specification mentioned herein is used to teach the spirit of the application, and the application should not be limited thereto.

In view of the forgoing embodiments of FIGS. 6-7, it will be appreciated that the present application realizes synchronization of the UE's measurement gap requirement information between the SN and the MN in the scenarios where MR-DC is configured, by allowing either the SN or the UE to provide the same measurement gap requirement information to the MN if the measurement gap requirement information is reported in response to the RRC Reconfiguration message sent by the SN.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A User Equipment (UE), comprising:
    a wireless transceiver, configured to perform wireless transmission and reception to and from a first base station; and
    a controller, coupled to the wireless transceiver, and configured to receive a Radio Resource Control (RRC) reconfiguration message from the first base station via the wireless transceiver, and in response to the UE being configured to provide measurement gap requirement information of New Radio (NR) target bands, send an RRC reconfiguration complete message comprising the measurement gap requirement information to the first base station via the wireless transceiver,
    wherein the measurement gap requirement information indicates whether a measurement gap is required for the UE to perform Synchronization Signal Block (SSB)-based measurements on each of the NR target bands supported by the UE,
    wherein the RRC reconfiguration complete message further comprises information indicating whether an interruption interval smaller than the measurement gap is required for the UE to perform SSB-based measurements on each of the NR target bands supported by the UE when the measurement gap is not required.

2. The UE of claim 1, wherein the controller is further configured to determine whether the RRC reconfiguration message comprises an indicator for requesting the UE to report the measurement gap requirement information, and determine that the UE is configured to provide measurement gap requirement information in response to the RRC reconfiguration message comprising the indicator for requesting the UE to report the measurement gap requirement information.

3. The UE of claim 1, wherein the controller is further configured to determine whether a handover of the UE from one cell to another is occurring, or whether the measurement gap requirement information is changed compared to last time the UE reported this information, and determine that the UE is configured to provide measurement gap requirement information in response to a handover of the UE from one cell to another occurring or in response to the measurement gap requirement information being changed compared to last time the UE reported this information.

4. The UE of claim 1, wherein the controller is further configured to determine whether the UE has not reported any measurement gap requirement information to the first base station on a current RRC connection, and determine that the UE is configured to provide measurement gap requirement information in response to the UE not having reported any measurement gap requirement information to the first base station on the current RRC connection.

5. The UE of claim 1, wherein the RRC reconfiguration message comprises at least one of a Carrier Aggregation (CA) parameter and a Layer 1 (L1) parameter, and the measurement gap requirement information is determined based on at least one of the CA parameter and the L1 parameter.

6. The UE of claim 5, wherein the CA parameter comprises configuration for Secondary cell (Scell) addition or release, and the L1 parameter comprises Multiple-Input and Multiple-Output (MIMO) configuration.

7. The UE of claim 1, wherein, when Multi-RAT Dual Connectivity (MR-DC) is configured for the UE to simultaneously communicate with both the first base station being a Secondary Node (SN) and a second base station being a Master Node (MN), the controller is further configured to send an RRC message comprising the measurement gap requirement information to the second base station via the wireless transceiver in response to sending the RRC reconfiguration complete message comprising the measurement gap requirement information to the first base station.

8. The UE of claim 7, wherein the RRC message is a UE assistance information message in compliance with a Third Generation Partnership Project (3GPP) Technical Specification (TS) 38.331 for NR, and the RRC reconfiguration message is received from the first base station via a Signaling Radio Bearer 3 (SRB3).

9. A method, comprising:
    receiving a Radio Resource Control (RRC) reconfiguration message from a first base station by a User Equipment (UE); and
    in response to the UE being configured to provide measurement gap requirement information of New Radio (NR) target bands, sending an RRC reconfiguration complete message comprising the measurement gap requirement information to the first base station by the UE,
    wherein the measurement gap requirement information indicates whether a measurement gap is required for the UE to perform Synchronization Signal Block (SSB)-based measurements on each of the NR target bands supported by the UE,
    wherein the RRC reconfiguration complete message further comprises information indicating whether an interruption interval smaller than the measurement gap is required for the UE to perform SSB-based measurements on each of the NR target bands supported by the UE when the measurement gap is not required.

10. The method of claim 9, further comprising:
    determining, by the UE, whether the RRC reconfiguration message comprises an indicator for requesting the UE to report the measurement gap requirement information; and
    determining that the UE is configured to provide measurement gap requirement information in response to the RRC reconfiguration message comprising the indicator for requesting the UE to report the measurement gap requirement information.

11. The method of claim 9, further comprising:
determining, by the UE, whether a handover of the UE from one cell to another is occurring, or whether the measurement gap requirement information is changed compared to last time the UE reported this information; and
determining that the UE is configured to provide measurement gap requirement information in response to a handover of the UE from one cell to another occurring or in response to the measurement gap requirement information being changed compared to last time the UE reported this information.

12. The method of claim 9, further comprising:
determining, by the UE, whether it has not reported any measurement gap requirement information to the first base station on a current RRC connection; and
determining that the UE is configured to provide measurement gap requirement information in response to the UE not having reported any measurement gap requirement information to the first base station on the current RRC connection.

13. The method of claim 9, wherein the RRC reconfiguration message comprises at least one of a Carrier Aggregation (CA) parameter and a Layer 1 (L1) parameter, and the measurement gap requirement information is determined based on at least one of the CA parameter and the L1 parameter.

14. The method of claim 13, wherein the CA parameter comprises configuration for Secondary cell (Scell) addition or release, and the L1 parameter comprises Multiple-Input and Multiple-Output (MIMO) configuration.

15. The method of claim 9, further comprising:
when Multi-RAT Dual Connectivity (MR-DC) is configured for the UE to simultaneously communicate with both the first base station being a Secondary Node (SN) and a second base station being a Master Node (MN), sending an RRC message comprising the measurement gap requirement information to the second base station by the UE in response to sending the RRC reconfiguration complete message comprising the measurement gap requirement information to the first base station.

16. The method of claim 15, wherein the RRC message is a UE assistance information message in compliance with a Third Generation Partnership Project (3GPP) Technical Specification (TS) 38.331 for NR, and the RRC reconfiguration message is received from the first base station via a Signaling Radio Bearer 3 (SRB3).

* * * * *